United States Patent
Elad et al.

(10) Patent No.: US 11,775,177 B2
(45) Date of Patent: Oct. 3, 2023

(54) INTEGRITY TREE FOR MEMORY INTEGRITY CHECKING

(71) Applicant: Arm Limited, Cambridge (GB)

(72) Inventors: Yuval Elad, Cambridge (GB); Roberto Avanzi, Munich (DE); Jason Parker, Sheffield (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/269,919

(22) PCT Filed: Oct. 17, 2019

(86) PCT No.: PCT/GB2019/052968
§ 371 (c)(1),
(2) Date: Feb. 19, 2021

(87) PCT Pub. No.: WO2020/128413
PCT Pub. Date: Jun. 25, 2020

(65) Prior Publication Data
US 2021/0311640 A1 Oct. 7, 2021

(30) Foreign Application Priority Data
Dec. 18, 2018 (GB) .................................... 1820597

(51) Int. Cl.
G06F 3/06 (2006.01)
G06F 16/901 (2019.01)
G06F 12/1009 (2016.01)

(52) U.S. Cl.
CPC .......... *G06F 3/0619* (2013.01); *G06F 3/0653* (2013.01); *G06F 3/0679* (2013.01); *G06F 12/1009* (2013.01); *G06F 16/9027* (2019.01)

(58) Field of Classification Search
CPC .... G06F 3/0619; G06F 3/0653; G06F 3/0679; G06F 12/1009; G06F 16/9027; G06F 21/64; G06F 21/78; G06F 21/57
See application file for complete search history.

(56) References Cited

U.S. PATENT DOCUMENTS

| | | | |
|---|---|---|---|
| 2005/0050342 A1* | 3/2005 | Boivie | G06F 21/64 713/181 |
| 2011/0283085 A1* | 11/2011 | Dilger | G06F 11/1004 711/216 |
| 2014/0101461 A1 | 4/2014 | Chhabra et al. | |
| 2017/0103039 A1* | 4/2017 | Shamis | H04L 67/1097 |

OTHER PUBLICATIONS

Carnegie Mellon [Retrieved Sep. 8, 2022] Retrieved from <URL:https://web.archive.org/web/20091214131207/https://www.cs.cmu.edu/~clo/www/CMU/DataStructures/Lessons/lesson4_1.htm> Archived on Dec. 14, 2009 (Year: 2009).*

(Continued)

*Primary Examiner* — David Yi
*Assistant Examiner* — Dustin B. Fulford
(74) *Attorney, Agent, or Firm* — NIXON & VANDERHYE P.C.

(57) ABSTRACT

An apparatus (4) comprises memory access circuitry (12) to control access to data stored in a memory; and memory integrity checking circuitry (20) to verify integrity of data stored in the memory, using an integrity tree (26) in which the association between parent and child nodes is provided by a pointer. This helps to reduce the memory footprint of the tree.

19 Claims, 9 Drawing Sheets

(56) References Cited

OTHER PUBLICATIONS

Bedicheck et al., "Some Efficient Architecture Simulation Techniques", Winter 1990 USENIX Conference, Jan. 1990, 12 pages.
International Search Report and Written Opinion for PCT/GB2019/052968 dated Dec. 16, 2019, 12 pages.
Combined Search and Examination Report for GB1820597.1 dated May 17, 2019, 6 pages.
Office Action for IN Application No. 202117014343 dated Feb. 22, 2023, 6 pages.
Office Action for IL Application No. 280846 dated Jul. 4, 2023, 4 pages.

* cited by examiner

INTEGRITY TREE FOR MEMORY INTEGRITY CHECKING

CROSS-REFERENCE TO RELATED APPLICATIONS

This application is the U.S. national phase of International Application No. PCT/GB2019/052968 filed Oct. 17, 2019 which designated the U.S. and claims priority to GB 1820597.1 filed Dec. 18, 2018, the entire contents of each of which are hereby incorporated by reference.

The present technique relates to the field of data processing. More particularly, it relates to memory security.

Some data processing systems may need to run software which involves the processing of secret or sensitive information which should not be exposed to a potential attacker. However, providing enough capacity to store all such information in a memory which cannot be tampered with by an attacker may be infeasible, and so sometimes it may be necessary to export some sensitive information to a memory which is vulnerable to attack. For example, while data stored on-chip may be secured against attacks, on-chip memory storage may be limited and so it may be required to write data to an off-chip external memory. An attacker may be able to read data from the external memory or intercept the data as it is passed to the external memory, and/or tamper with data values stored in the external memory in an attempt to cause incorrect behaviour when such externally stored data is subsequently brought back into the processing system.

To provide confidentiality, data stored to a potentially unsafe memory may be encrypted before being passed memory and being decrypted on reading from the memory. However this may not address the risk of tampering. To protect against tampering, integrity checks may be provided to check, when data is read from the memory, that the data has not been modified since it was stored from memory.

At least some examples provide an apparatus comprising: memory access circuitry to control access to data stored in a memory; and memory integrity checking circuitry to verify integrity of data stored in the memory, using an integrity tree comprising a plurality of nodes including: at least one leaf node comprising at least one leaf entry comprising at least one integrity tag for verification of a corresponding address block of data stored in the memory; and at least one branch node comprising at least one branch node comprising at least one branch entry comprising: a pointer for specifying an address of a child node of the branch node, where the child node is a leaf node or a further branch node of the integrity tree, and at least one integrity checking value for verification of a corresponding branch entry or leaf entry of the child node.

At least some examples provide a method comprising: controlling access to data stored in a memory; and verifying integrity of data stored in the memory, using an integrity tree comprising a plurality of nodes including: at least one leaf node comprising at least one leaf entry, each leaf entry comprising at least one integrity tag for verification of a corresponding address block of data stored in the memory; and at least one branch node comprising at least one branch entry, each branch entry comprising: a pointer for specifying an address of a child node of the branch node, where the child node is a leaf node or a further branch node of the integrity tree, and at least one integrity checking value for verification of a corresponding branch entry or leaf entry of the child node.

At least some examples provide a computer program for controlling a host data processing apparatus to provide an instruction execution environment for execution of instructions; the computer program comprising: memory access program logic to control access to a simulated address space of the instruction execution environment; and memory integrity checking program logic to verify integrity of data stored at addresses within the simulated address space, using an integrity tree comprising a plurality of nodes including: at least one leaf node comprising at least one leaf entry comprising at least one integrity tag for verification of a corresponding address block of data stored in the memory; and at least one branch node comprising at least one branch entry comprising: a pointer for specifying an address of a child node of the branch node, where the child node is a leaf node or a further branch node of the integrity tree, and at least one integrity checking value for verification of a corresponding branch entry or leaf entry of the child node.

A storage medium may store the computer program described above. The storage medium may be a non-transitory medium.

Further aspects, features and advantages of the present technique will be apparent from the following description of examples, which is to be read in conjunction with the accompanying drawings, in which:

FIG. 1 schematically illustrates an example comprising an apparatus of memory integrity checking circuitry;

Figure 1:
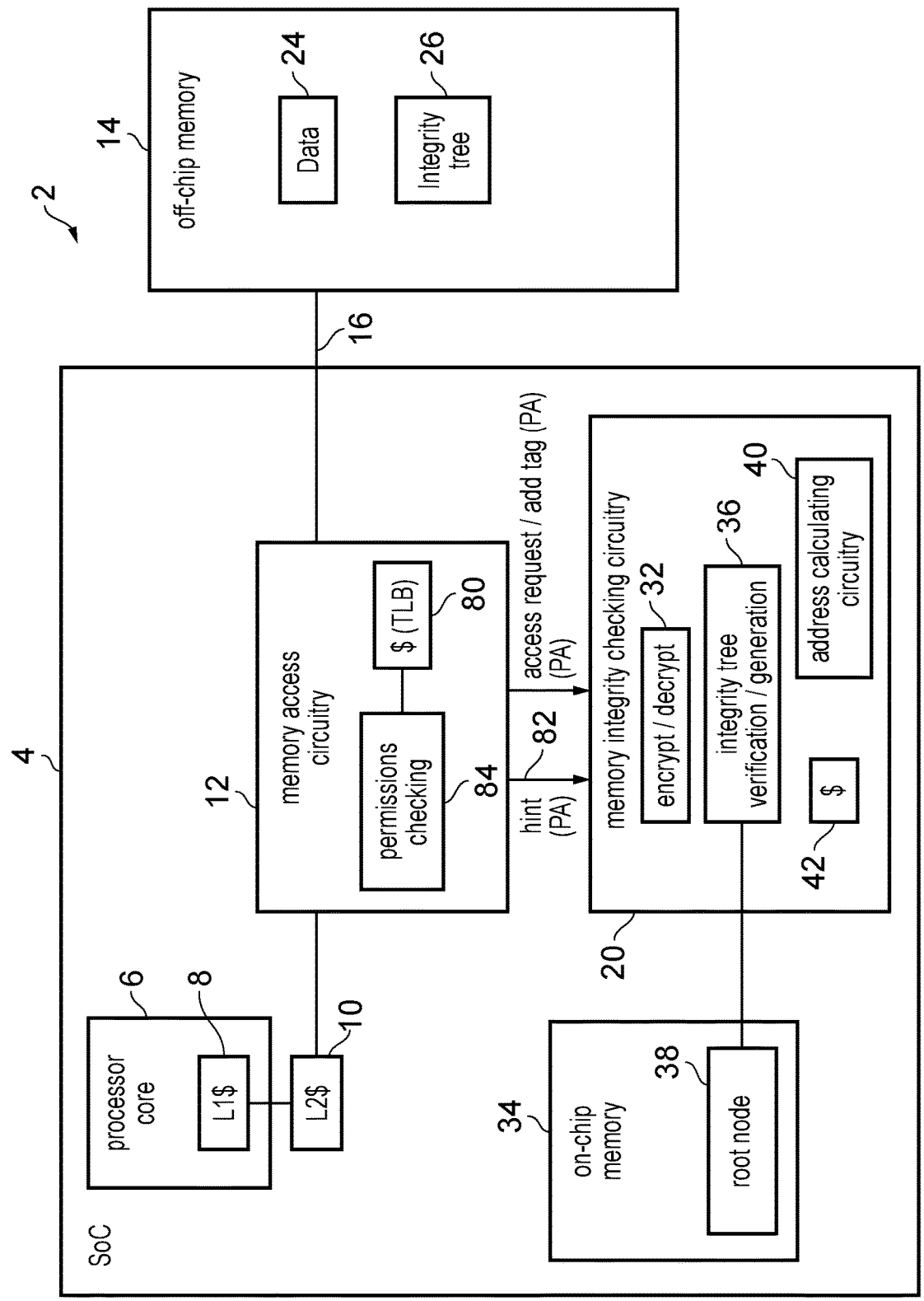

An apparatus may have memory access circuitry for controlling access to data stored within a memory, and memory integrity checking circuitry for verifying integrity of data stored in the memory. For example, the integrity verification may be for detecting an attacker tampering with the data stored in the memory. For example, the memory could be an off-chip memory on a separate integrated circuit from the integrated circuit comprising the memory access circuitry and memory integrity checking circuitry.

The integrity verification may depend on a comparison between the stored data and the integrity metadata maintained by the memory integrity checking circuitry. For example, when writing data to the memory, the memory integrity checking circuitry could generate the integrity metadata based on properties of data stored memory, and then when reading data from the memory, the previously stored integrity metadata can be used to check whether the data has changed since it was written. However, such integrity metadata can require a significant amount of storage space to provide all the metadata for protecting data across the required address range. Often the capacity to hold data in a storage unit which is not vulnerable to an attacker, such as an on-chip memory on the same integrated circuit as the memory access circuitry, may be limited. Hence, in practice it may be required to store at least part of the integrity metadata to the same memory as storing the data to be protected. This may make the metadata vulnerable to an attack, so the integrity metadata may itself be subjected to integrity verification when it is read, in a similar way to the actual data of interest, based on further metadata which may also be stored in the memory. To manage a series of integrity checks for the data of interest and each piece of integrity metadata required for verifying the data, it can be useful to represent the metadata as an integrity tree comprising a number of nodes, where a root node can be used to verify a number of branch nodes that are child nodes of the root node, each of those branch nodes can then be used to verify further branch nodes which are child nodes of those earlier branch nodes, and so on until leaf nodes are reached which can be used for verification of a corresponding address block of data stored in the memory.

In one approach for implementing the integrity tree, a single contiguous block of the address space may be defined as a protected region whose data is to be protected using the integrity tree, and another contiguous block of the address space is pre-allocated in advance to accommodate the integrity tree which will include sufficient nodes to be able to protect the entire protected address range. With this approach, the address at which a given tree node is stored can be computed from a base address of the integrity tree and the target address of the data block in the protected region whose integrity is to be verified using the tree.

However, this approach may suffer from several problems. As the memory integrity tree has to be stored to a single continuous block of the address space, this will tend to limit the maximum size of the protected region within which data can be protected by the integrity tree, as it may be difficult to find a large contiguous block of addresses for storing the tree, which has not been allocated for other purposes already. Hence in practice with this approach it is normal to limit the extent of the protected address range to a certain size, e.g. in the order of 128 megabytes. Limiting the protection to a specific address range can pose a severe restriction for an operating system running on the processor, as efficient memory management may require the ability to freely choose the physical location for storing protected application pages or virtual machine pages.

Another issue is that as the integrity tree may be preallocated in advance to accommodate the entire potential protected address range within which data can be protected, then even if the operating system only chooses to allocate sensitive data to a subset of the pages within that protected address range, the full memory footprint of implementing the integrity tree across the whole protected address range has already been incurred, so that it is not possible for the operating system to allocate other data to the contiguous part of the address space allocated for the integrity tree, even if only a small fraction of the nodes of the integrity tree have actually been defined as providing integrity metadata for verifying integrity of specific blocks within the protected address range.

In the technique discussed below, the memory integrity checking circuitry verifies integrity of data stored in the memory using an integrity tree which uses a pointer to provide the association between a branch node of the tree and its child node. Hence, the tree may include at least one leaf node which comprises at least one leaf entry comprising at least one integrity tag for verification of a corresponding address block of data stored within the memory, and at least one branch node which comprises at least one branch entry. The branch entry comprises a pointer for specifying the address of a child node of the branch node (where the child node is either a leaf node or a further branch node of the integrity tree), and also specifies at least one integrity checking value for verification of a corresponding branch entry or leaf entry of the child node.

Use of such a pointer to provide the association between a branch node and its child node may be seen as counterintuitive, as one might expect that the pointer would require additional storage capacity within each branch entry, and also that the use of pointers would mean that traversal of the tree to locate the relevant leaf entry for verifying a given block of data stored in the memory would require following a trail of pointers from the root of the tree down to the leaf node, so that some additional latency may be incurred for locating the leaf node compared to an approach where it is possible to index directly to the leaf mode based on the address of the block of data to be verified. However, the inventors recognised that such latency can be mitigated against by hiding it under the latency associated with other operations, and so is not as significant a problem as one might expect.

On the other hand, by using pointers to provide the association between a branch nodes and its child nodes, this allows for the integrity tree to protect a potentially large memory range (even a range spanning the entire physical memory provided) while only incurring the memory allocation cost of allocating space for a number of integrity tree nodes which are needed to protect the actual individual address blocks of data which are to be protected by the tree, rather than the potential protected range over which those protected address blocks could be located. This greatly reduces the overhead of maintaining the memory integrity tree, and simplifies the design of operating systems using the tree, since the operating system may be free to allocate the data to be protected, and the nodes of the integrity tree, to any desired address in the memory space, without being restricted to limited address ranges or to addresses within a certain contiguous block.

As discussed above, verification of a given data block in memory may also involve verification of a number of nodes of the integrity tree based on their parent nodes. When a given branch entry is to be verified, the integrity checking value specified in a parent node of the given branch entry may be used to verify the contents of that given branch entry, including the pointer. Hence, not only the integrity checking value(s) specified by the branch entry may be verified, but also the pointer. This protects against an attacker tampering with the pointer specified by a given branch entry in an attempt to evade the integrity checks.

The memory integrity checking circuitry may support the integrity tree being configured to include one or more leaf nodes specifying leaf entries corresponding to discontiguous groups of address blocks within a memory address space, for which at least one intervening group of address blocks between the discontiguous groups of address blocks is unprotected by the integrity tree. Hence, the protected address blocks whose integrity is protected by the integrity tree do not need to be stored within a contiguous block of memory, which makes development of the operating system much simpler as the operating system can allocate its sensitive data to any physical address it likes.

Also, the memory integrity checking circuitry may support the integrity tree being configured to include nodes stored at two or more discontiguous groups of address blocks within a memory address space, for which at least one intervening group of address blocks between the discontiguous groups of address blocks comprises at least one of: unallocated memory; and memory allocated for storing data other than said integrity tree. Again, this simplifies management of memory allocation by the operating system and also means that the memory footprint of the integrity tree may be proportional to the size of the discontiguously located address blocks which are actually protected by the tree, rather than the size of the contiguous region which could potentially be protected by the tree as in the approach discussed above.

In response to a request specifying a target address of a given address block of data stored in memory, the memory integrity circuitry may trigger a top-down traversal of the integrity tree from a root node to a given leaf node which comprises the integrity tag corresponding to the given address block. This contrasts with the approach discussed above where the tree would typically be traversed in a bottom-up manner starting at the leaf node and then stepping from parent node to child node until the root node is reached.

In the top-down traversal of the integrity tree, the traversal may step from parent node to child node, following the trail of pointers in each branch node. Hence, the traversal may involve a number of parent-child node pairs of the integrity tree which are on a path from the root node to the given leaf node. For a given parent-child node pair comprising a given parent node and a given child node, the memory integrity checking circuitry may trigger a read operation to read a corresponding child entry of the given child node from the memory address calculated based on the pointer specified by a corresponding parent entry of the given parent node and an offset identified based on the target address of the given address block. Also, the memory integrity checking circuitry may perform a verification operation to verify integrity of the corresponding child entry based on a corresponding integrity checking value specified in the corresponding parent entry of the given parent node.

One might expect that this top-down traversal would increase the latency of the integrity checking since the pointer in the parent node will need to be read before the child node at the next level of the tree can be read. However, this additional latency can be mitigated against by performing the read operation to locate the child entry in parallel with the verification operation being performed on the parent entry from a previous step of the top-down traversal. That is, while the integrity of the corresponding parent entry is being verified based on a corresponding integrity checking value specified in the given parent node's own parent node (i.e. the grandparent node of the child node), the read operation to read the corresponding child entry of the given child node can be triggered in parallel to reduce the delay in locating the child node if the verification of the parent node is successful.

The memory integrity checking circuitry may support a branch node of the tree specifying a null indicator within a branch entry. The null indicator may indicate that any addresses which fall under that branch entry have not yet been allocated as needing protection by the memory integrity tree, and so there are no further branch nodes or leaf nodes under that branch entry. Hence, the memory integrity tree does not need to form a complete tree structure. Instead, nodes can be allocated to the tree as more data requiring protection is allocated to the memory, to ensure that the memory footprint of the integrity tree tracks the actual amount of data that needs to be protected rather than the size of the contiguous address region requiring protection as in the approach discussed above.

The use of the null indicator can be useful because the memory integrity checking circuitry may then halt the top-down traversal in response to detecting, on a path from the root node to a given leaf node, a branch node for which a corresponding branch entry for the given address block specifies a null indicator. This allows for a relatively quick detection that a certain address block in memory does not require protection and hence it is not needed to complete the entire top-down traversal. This helps to reduce the performance impact of the integrity checking.

The null indicator could be represented in different ways. In one example the null indicator may comprises an integrity checking value specified in a given branch entry, which specifies a particular null value.

However, it can be particularly useful for the null indicator to comprise a pointer which specifies a null value. The null value could be one single predetermined value, or could be a group of values which share a certain subset of bits. For example in one example the pointer could have a particular bit (e.g. the least significant bit) set to 1 if it represents a null value and to 0 if it represents an actual address pointer.

The top-down traversal of the integrity tree could be triggered by a number of different types of request. For example a memory access request, which is requesting read or write access to a given block in memory, could trigger traversal of the tree in order to verify whether the data at the required block is valid and has not been tampered with. Alternatively a tag adding requests which requests the addition of an integrity tag for a newly allocated block in memory could be issued, which would then lead to an update of the integrity tag at the corresponding leaf node of the integrity tree. However, in order to add a new integrity tag to a tree, this may then require corresponding integrity checking values or tags at the parent node of the leaf node and higher nodes to be updated to match the newly added integrity tag, and so prior to performing those updates it may be required anyway to verify that all of nodes are themselves valid before performing the update, otherwise an attacker tampering of one of the higher nodes could remain undetected. Hence, the request to add an additional integrity tag to a given leaf node may itself require the top-down traversal involving the verifications discussed above.

For a memory access, when a null indicator is detected at a given branch entry of a branch node as discussed above, then the memory integrity checking circuitry could either simply treat the given address block requested to be accessed by the memory access request as an unprotected address block for which no integrity verification is required, and hence allowed the memory access to proceed, or alternatively the memory access request could return an indication that integrity verification is successful for the given address block, without distinguishing whether the address block was protected or unprotected.

For a tag adding request, if the top-down traversal detects a given branch node for which the corresponding branch entry specifies the null indicator, then the memory integrity circuitry may trigger software to allocate memory address space for storing a further child node of the given branch node and then update the pointer of the corresponding branch entry of the given branch node to indicate an address specified by the software as being allocated for the further child node. Also, if the pointer itself did not represent the null indicated, then the memory integrity checking circuitry may also clear the null indicator represented by another part of the corresponding branch entry. If the pointer represents the null indicator then the update of the pointer to match the address allocated for the further child nodes may be sufficient to clear the null indicator. Either way, the use of the pointer-based tree structure means the software executing on the processing circuitry may have complete freedom in the choice of the address allocated for storing the further child node. This makes mention to the address allocations much simpler.

The integrity checks discussed above may not be the only types of checks performed in response to a memory access request which requests access to data for a given address block. In addition, the memory access circuitry may also perform access permission checking to check whether the given address block is allowed to be accessed. For example, this access permission checking could be based on page tables which specify various attributes for the given address block, such as attributes restricting which privilege levels of the processing circuitry are allowed to access the given address block, or attributes specifying whether the address block is read only or can be both read and written to. Another form of access permission checking may be to check whether the given address block is associated with a secure domain or a less secure domain of operation, so that addresses associated with the secure domain may be prevented from being accessed by code operating in a less secure domain. Also, some architectures may provide an ownership table which defines, for a given address region, an owner process which is allowed to specify which other processes are allowed to access the data. This can allow an owner process operating at a less privileged operating state to exclude a more privileged process executed at a higher privilege level from accessing the data stored in the region owned by the owner process. Hence, in some examples, the memory access checking may also be based on such an ownership table.

Regardless of the specific type of access permission checking performed, the access permission checking may incur some latency. For example, if the access permission checking is based on tables stored in memory, then if the required entry of the permission defining table is not already cached it may take some time to fetch the entry from memory.

Hence, in some examples before the access permission checking performed by the memory access circuitry is complete, the memory access circuitry may provide a hint signal specifying an address of the given address block for which access was requested to the memory integrity checking circuitry. In response to the hint signal, the memory integrity circuitry may trigger a read of at least one node of the integrity tree before the access permission checking performed by the memory access circuitry is complete. Hence, this can hide some of the latency associated with the integrity checking circuitry, because the memory integrity checking circuitry can start to read nodes of the integrity tree in the period when the memory access permission checking is being performed. For example the memory integrity checking circuitry could warm up its caches of integrity tree nodes based on the hint provided. Even if the memory access circuitry then subsequently determines that the access fails the access permission checks, it may still have been useful to warm up the caches of the memory integrity checking circuitry as a subsequent request could still benefit from that caching. Hence, this approach can improve performance of integrity checking.

The nodes of the integrity tree could be stored in the same memory as the data protected by the integrity tree. Alternatively, the nodes the integrity tree could be stored in a different memory to the memory storing the data protected by the integrity tree. The integrity tree configuration discussed above allows for protecting one memory type using structures stored in a different memory type. For example the integrity tree nodes could be stored in a memory with reduced access latency compared to the memory storing the protected data itself, to reduce the performance cost of performing the integrity checking.

The root node of the integrity tree may be stored in an on-chip memory provided within the same integrated circuit as the memory integrity checking circuitry. An on-chip memory may be protected from tampering because the communication path between the on-chip memory and processor core is not exposed to the outside, and so this allows the root node to serve as the root of trust for the entire integrity tree.

The root node may comprise a pointer specifying an address of a top-level branch node of the integrity tree, where the top-level branch node is a child node of the root node. Also the root node may specify at least one integrity checking value for verification of a corresponding branch entry of the top-level branch node. In some cases the root node may comprise multiple integrity checking values each corresponding to a different branch entry within the top-level branch node.

Unlike in the approach discussed above, where an integrity tree of a fixed pre-allocated size is allocated prior to storing any protected data in the memory, with the approach using pointers discussed above, it is possible to add additional levels to the integrity tree after some protected data protected by the tree has already been stored in memory. Hence, in response to a request to add a level to the integrity tree, the memory integrity checking circuitry may be configured to store a new top-level branch node of the integrity tree to an address specified by software as being allocated for storing the new top-level branch node, the new top-level branch node including the pointer and the at least one integrity checking value previously specified by the root node; update the pointer of the root node to specify the address allocated for storing the new top-level branch node; and update the at least one integrity checking value of the root node to correspond to contents of the new top-level branch node. Hence, it is not necessary to decide on the number of levels on the integrity tree in advance. Additional levels can simply be added when required and this again helps to limit the memory footprint of the trees so that only the required amount of space for protecting the amount of protected data already allocated is needed. Effectively, when a new level is added to the integrity tree, the previous contents of the root node are stored out to memory to become a new branch entry within a new top-level branch node root (with other entries of the new top-level branch node specifying the null indicator) and then the root node is updated to point to that new top-level branch node and include at least one integrity checking value which corresponds with the contents of the non-null entry of the new top-level branch node.

The integrity checking values within the branch entries of the tree can be implemented in different ways. In one example each integrity checking value may comprise integrity tags derived as function of the corresponding branch entry or leaf entry of the child node pointed to by the pointer of that branch entry. For example, each integrity tag may be a hash of the corresponding branch entry or leaf entry, so that the overall tree forms a tree of hashes where a given entry within a child node can be verified by calculating its hash based on the stored value of that entry and comparing the calculated hash with the integrity tag stored within the branch entry which is the parent of that child node. The hashes could also be based on counters to provide freshness to protect against replay attacks.

Alternatively, for a given branch entry of a given branch node, each integrity checking value may comprise at least one integrity nonce (number used once) for computing a corresponding integrity tag stored in the corresponding branch entry or leaf entry of the child node pointed to by the pointer of the given branch entry. In this case the integrity tag which is in a given child node or leaf entry of a child node would be derived as a function of (i) the integrity nonce stored in the child node's parent entry, and (ii) other contents of that the child node entry. Hence, a given branch entry may specify a group of integrity nonces corresponding to respective branch entries or leaf entries of the child node, which may be protected by a shared integrity tag derived as a function of the group of integrity nonces and an integrity nonce specified in a parent node of the given branch node.

The use of an integrity nonce to calculate an integrity tag can be useful for guaranteeing freshness to protect against replay attacks where an attacker attempts to provide a previous valid value of an integrity tag (captured before an update to the corresponding data) but which is out of date because the corresponding data protected by the tag has since changed. The integrity nonce may be a random number which is changed each time the corresponding integrity tag is updated or could be any other value which is changed each time the integrity tag is updated. However, a simple way of implementing the integrity nonces can be as monotonically increasing encounters which are incremented each time an update of the corresponding integrity tag in made. With the approach using such integrity nonces or counters, one approach for reducing the memory footprint of the tree may be that the tree only provides integrity protection for the integrity nonces at each branch node but does not protect the corresponding integrity tag. Unlike the hash tree discussed above, with a counter tree or nonce tree the tag which protects the contents of a given branch entry or leaf entry is stored with that branch entry or leaf entry itself.

When the tree is based on a tree of integrity nonces then each group of integrity nonces within a given branch entry can be implemented either as a group of non-split counters which are specified independently for each branch entry or leaf entry of the child node corresponding to that given branch entry, or as a group of split counters, where each split counter is represented as a combination of a major counter shared between the respective branch entries or leaf entries of the child node and a minor counter specified separately for each branch entry or leaf entry of the child node. The use of split counters can help reduce the overall size of the group counters provided within a given branch entry. With split counters the minor counter for a given child entry would be incremented when the corresponding child entry is updated, and if incrementing the minor counter causes an overflow then the corresponding major counter may itself be updated, and then this may require recomputation of all of the tag values within the respective branch entries or leaf entries of the child node pointed to by the branch entry comprising that major counter.

Hence, the present technique encompasses either a tree of hashes or a tree of counters (nonces). In the example above of adding an additional level to the integrity tree, when the root node is updated to have its integrity checking value correspond with the contents of the new top-level branch node, this could either be done by computing a new integrity tag of the root node based on the contents of the new top-level branch node or by updating a nonce of the root node to match the nonce value used for computing the tag of the new top-level branch node.

As well as managing integrity checks, the memory integrity checking circuitry could also encrypt data on writing to the memory and decrypt the data on reading it.

The technique discussed above can be implemented in a physical device having bespoke circuitry providing the functions of the memory integrity checking circuitry in hardware. Hence, the software executing on a processing apparatus need not be aware that the integrity verification operations are being performed, as this could be done automatically by the memory integrity checking circuitry provided in hardware. Hence, when the software instructs data to be written to a protected address, the memory security circuitry could encrypt the data prior to writing it to the memory, and control generation of the corresponding integrity tree nodes and/or verification based on the integrity tree that the memory has not been compromised by an attacker. Similarly, on reads to the protected memory region by the software, the memory security hardware may control decryption of the read data and the checking of the integrity tree nodes for verifying that the read data is still valid.

However, in other examples, encryption/decryption, generation of integrity tree nodes, and integrity verification operations based on the stored integrity tree, may be performed by software executing on a general purpose processing circuitry within an apparatus, which does not itself have the hardware for automatically performing such memory security operations. For example, the software may be platform-level code such as an operating system, hypervisor, software executing at a higher privilege level, or system firmware, which may support other applications running below it under its control. For example a virtual machine or simulator program may execute application code as if the hardware actually has the memory integrity checking circuitry, with the virtual machine or simulator program intercepting memory access instructions, and in response to such instructions, triggering encryption or decryption of data or triggering the operations for maintaining the integrity tree and/or verifying integrity of data based on the integrity tree. Hence, in some examples the technique may provide a storage medium which stores a computer program to control a data processing apparatus to provide a method as discussed above.

FIG. 1 schematically illustrates an example of a data processing system 2, which comprises an integrated circuit or system on chip 4 which includes at least one processor core 6 for executing program instructions to carry out data processing operations. While FIG. 1 only shows one processor core in some cases the system on-chip 4 may comprise multiple processors. Each processor core or processor core cluster may have a cache 8 (or multiple levels of cache 8, 10). A memory controller 12 acts as memory access circuitry for controlling access to an off-chip memory 14 which is on a separate integrated circuit from the system on-chip 4. While accesses to data on-chip may be difficult to tamper with by an attacker, the edge of the system on-chip may act as a trust boundary and any data passing beyond that boundary may be vulnerable to attack by intercepting data on the physical channel 16 between the memory controller 12 and the off-chip memory 14, or by reading or modifying the data while it is stored in the off-chip memory 14. While FIG. 1 shows an example where the trust boundary corresponds to the edge of the system on-chip, in other cases there could be trust boundaries within a system on-chip which could expose data beyond the trust boundary to potential attacks.

The system on-chip 4 may include memory integrity checking circuitry 20 provided for protecting data stored to the off-chip memory 14 from a malicious adversary who has physical access to the system and the ability to observe and/or replay the data or code being exchanged between the microprocessor and the off-chip system memory 14. The memory 14 stores the data 24 to be protected as well as integrity tree metadata 26 used in the verification of the data 24.

The memory integrity checking circuitry 20 includes encryption/decryption circuitry 32 for encrypting data being written to the off-chip memory 14 and decrypting data read back from the off-chip memory. This provides privacy by preventing a malicious observer from seeing in the clear the data being read from or stored onto the off-chip memory 14. Encryption keys used by the encryption and decryption may be stored within an on-chip memory (e.g. SRAM) 34 on the system on-chip or within the memory integrity checking circuitry 20 itself. Any known technique may be used for the encryption and decryption, and any known approach for protecting the encryption keys can be used.

The memory integrity checking circuitry 20 also includes integrity tree generation and verification circuitry 36, referred to in general as verification circuitry 36 below. The verification circuitry 36 is responsible for maintaining the integrity tree 26 in the memory 14. The integrity tree may provide a number of pieces of information for verifying whether data currently stored in the memory 14 is still the same as when it was written to that region. The checking of data integrity can for example be achieved using message authentication codes (MACs) which may be generated from the stored data using one-way cryptographic functions such as AES-GCM or SHA-256, which use functions which make it computationally infeasible for an attacker to guess the authentication code associated with a particular data value by brute force when a secret key used to generate the authentication code is unknown. The authentication codes may be stored alongside the data 24 or in a separate data structure. The stored MAC for a data value is checked against a calculated MAC derived from the stored data using the same one-way function used to generate the stored MAC, and if a mismatch is detected between the stored MAC and calculated MAC then this may indicate that the data has been tampered with.

However, providing MACs alone may not be sufficient to prevent all attacks. Another type of attack may be a replay attack where a malicious person with physical access to the system stores a legitimate combination of the encrypted data and the MAC which was observed previously on the bus and then replays these onto the bus later with an intent to corrupt data at a given memory location with stale values so as to compromise the operation of the system. Such replay attacks can be prevented using the integrity tree 26, which may provide a tree structure of nodes where each leaf node of the tree provides integrity data for verifying that one of the blocks of data 24 in the protected memory region 22 is valid and a parent node of a leaf node provides further integrity data for checking that the leaf node itself is valid. Parent nodes may themselves be checked using further parent nodes of the tree, and this continues as the tree is traversed up to the root of the tree which may then provide the ultimate source of verification. A root node 38 stored in the on-chip memory 34 may be used to verify that the root of the tree is authentic.

The memory integrity checking unit 20 may have address calculating circuitry 40 for calculating the addresses at which the nodes of the integrity tree 26 required for checking particular data blocks are located in the protected memory region 22. Optionally, the memory security unit 20 may also have a cache 42 for caching recently used nodes of the integrity tree for faster access than if they have to be read again from the off-chip memory 14. Alternatively, the memory integrity checking unit 20 could have access to one of the caches 10 which may also be used by the processor core 6 and so caching of data from the integrity tree 26 within the shared cache 10 could also help to speed up operation of the memory integrity checking unit 20.

Figure 2:
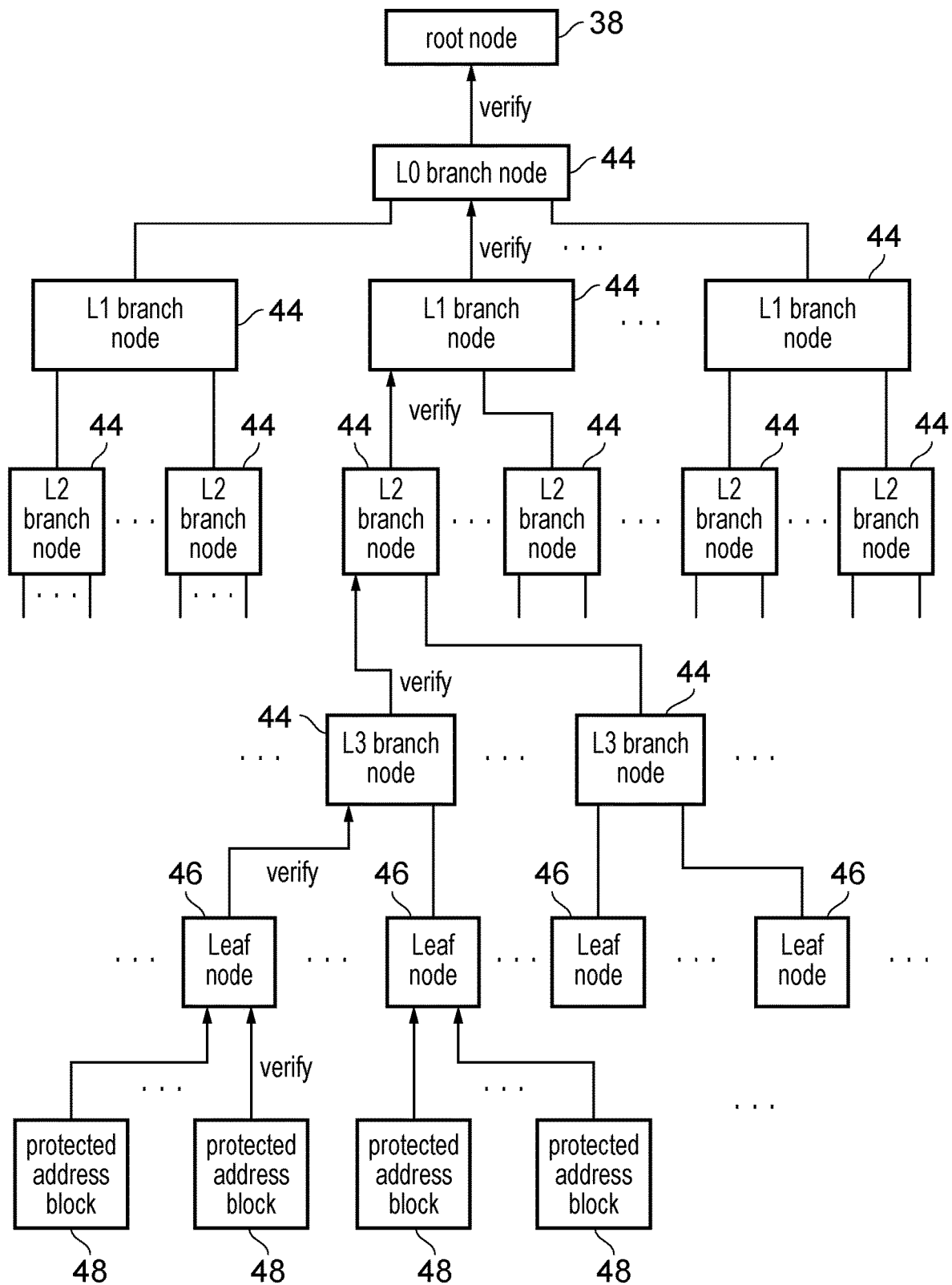
FIG. 2 illustrates an example of an integrity tree for use in the integrity checking.

The techniques described below use a novel integrity protection structure (Nested Protection Table, NPT) which can be used for the integrity tree 26, for storing tags that protect the integrity of the data 24, which requires a memory footprint proportional only to O{Actual Protected Range} instead of O{Potential Protected Range} (as existing integrity tree solutions require), while allowing the protected cache-lines to be located anywhere within an arbitrarily sized potential protected range and without sacrificing performance. FIG. 2 shows an example of an integrity tree 26, which comprises a root node 38 stored in the on-chip memory 34, and a number of branch nodes 44 and leaf nodes 46 stored in the off-chip memory 14. Each node other than the root node 38 is a child node of a given parent node, where the parent node provides some information which can be used during the verification of the integrity of the child node.

Each leaf node 46 provides an integrity tag for verifying a corresponding protected address block 48 of the address space used to address the off-chip memory 14 (e.g. the protected address block may be one DRAM cache line, although other examples could provide tags at a different granularity). An integrity tag is a value that is used to authenticate a memory object (such as a DRAM cache-line). The tag can be a hash calculated over the object or a MAC value (calculated using a key). In both cases, a running counter may be used as an additional input when calculating the tag to guarantee freshness and provide anti-replay protection.

The tags are typically stored in the off-chip memory 14 (e.g. DRAM) and so the integrity of the tags themselves should be guaranteed as well. Hence, the leaf node 46 can be verified using an integrity checking value provided by the parent node of the leaf node 46 (in this example, a level 3 branch node 44), that branch can then be verified using an integrity checking value provided by the parent node of that branch node (in this example, a level 2 branch node 44), and so on up the tree until the root node 38 is used to verify integrity of the Level 0 branch node. In this way, the root node provided inside the trust boundary (e.g. the boundary of the System on Chip) can be used as the root of trust for guaranteeing integrity of the integrity tree 26 and data 24 stored beyond the trust boundary.

Hash trees such as the Merkle tree construction are one mechanism for validating the authenticity of integrity tags efficiently. This is achieved by managing an n-ary tree (e.g. with a fixed number of descendants: binary, ternary, etc.) of hash values over the integrity tags. The protected objects, their corresponding integrity tags and the hash tree nodes protecting these tags are stored in untrusted memory. The hash tree root is located in trusted memory thus allowing to form a secure authentication chain. A variant of the hash-tree described above is forming an integrity tree that protects only the counter values that are used for calculating the tags, while continuing to store the tags themselves in unprotected memory and without providing for a tree-based protection for the tags.

Having a good method to guarantee the integrity and freshness of untrusted memory is a fundamental requirement in any trusted execution environment. It is also a difficult problem to solve in terms of memory footprint and performance without posing severe restrictions on host software memory management. Implementations using a Merkle tree tend to severely limit the size of the protected address range that can be protected by the tree.

Figure 3:
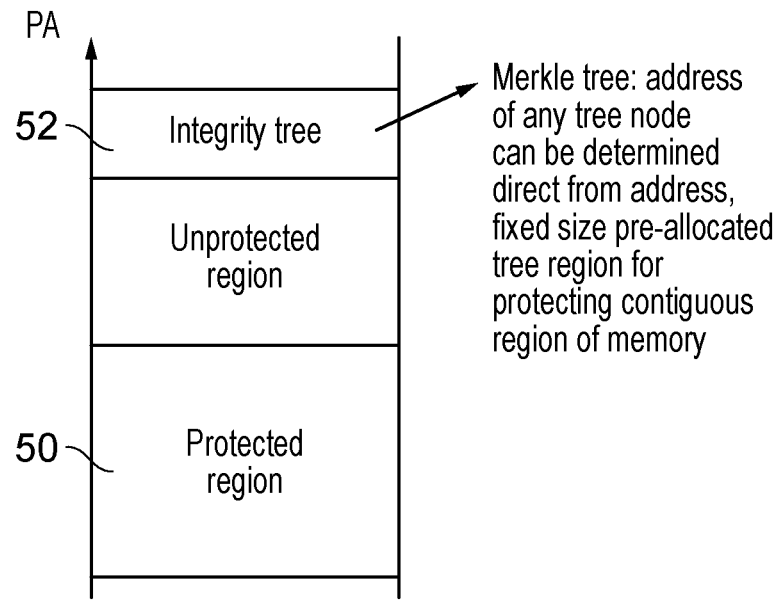
FIG. 3 illustrates an alternative approach where the integrity tree is implemented as a Merkle tree, which occupies a contiguous region of memory of size dependent on the size of the protected region to be protected against tampering.

This is because, as shown in FIG. 3, existing integrity implementations are based on defining a single limited consecutive DRAM address range 50 which is integrity protected and forming a corresponding hash-tree 52 that protects the entire address range. With this approach, the hash tree 52 forms a complete tree and the address of any individual tree node 44, 46 can be computed direct from the address of the protected block 48 to be verified (the address can be used to index directly to the relevant leaf node 46 or branch node 44). The memory footprint of the hash tree (which depending on the solution can be up to 16% of the protected address range) is pre-allocated in advance to accommodate the entire potential range 50 to be protected. The hash tree 52 has to occupy a single contiguous region of the address space. This can be a problem as if the protected address range is large then it may be hard to find a single unallocated region of sufficient size to accommodate the hash tree 52. It should also be noted that limiting the protection to a specific address range poses a severe restriction for operating systems, as their optimized memory management requires the ability to freely choose the physical location for storing protected application pages or VM pages.

The technique discussed below allows forming a secure integrity-chain structure for protecting a memory range that can span the entire physical memory of the system while only incurring the cost of the actual protected memory size. Additionally, the technique allows protecting one memory type (e.g. Low Power DRAM or High Bandwidth Memory or even Persistent Memory) using structures stored in a different memory type (e.g. Reduce Latency DRAM).

Figure 5:
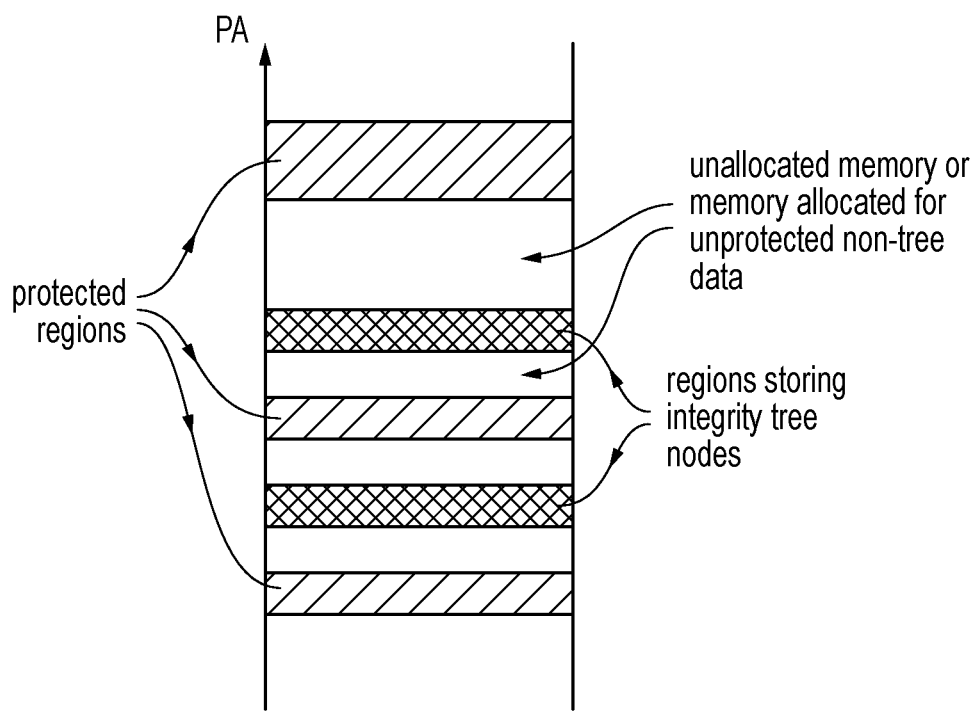
FIG. 5 shows an example of using an integrity tree stored in a number of discontiguous address regions of an address space to protect a number of other address regions which are also discontiguous within the address space.
Figure 4:
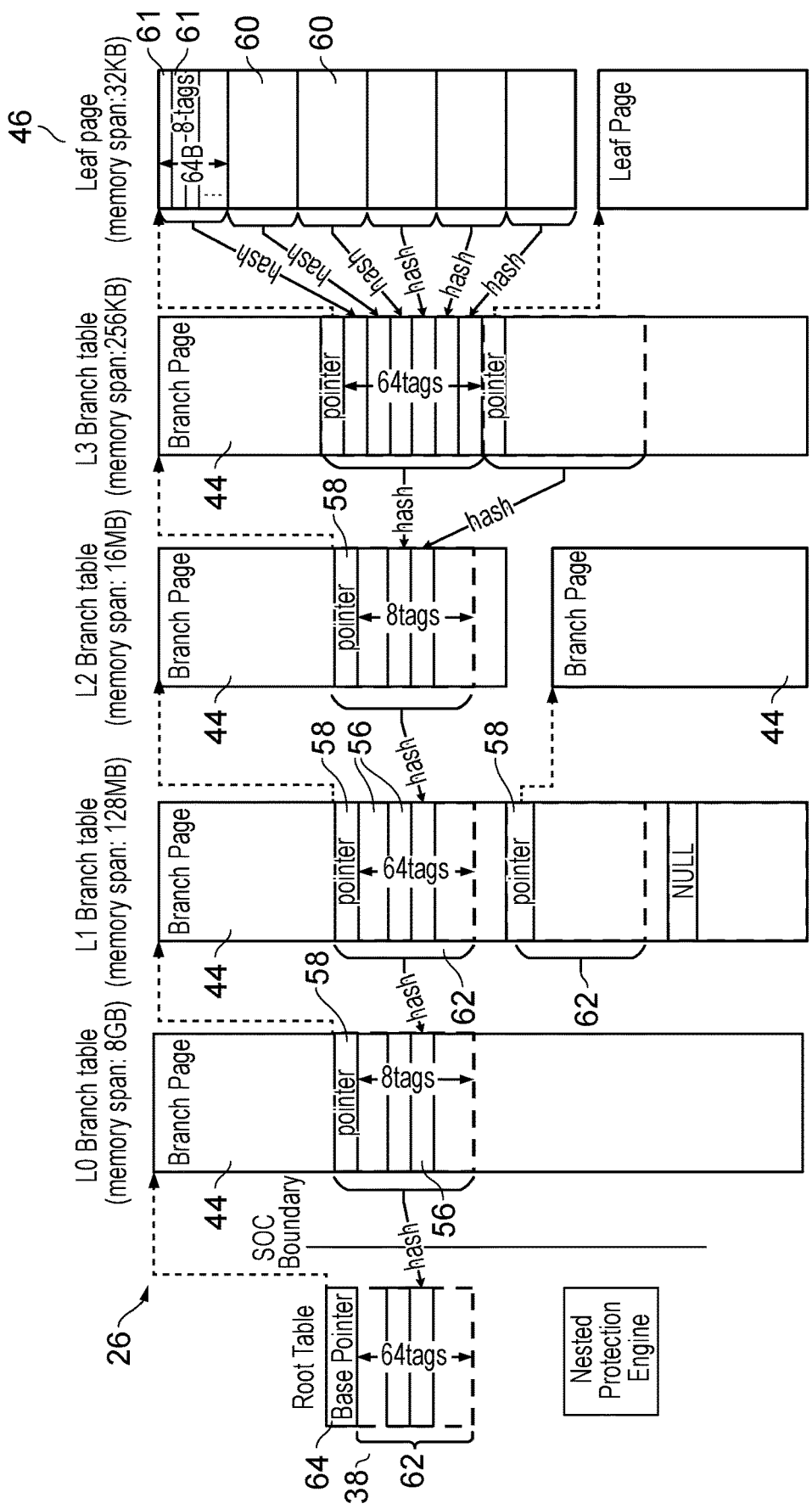
FIG. 4 shows an example where the integrity tree is constructed with pointers used to provide the association between parent and child nodes of the tree.

As shown in the example of FIG. 4, this is achieved using a novel multilevel integrity-protected nested table, where a tag 56 in the table protects a group of child tags along with a pointer 58 to their location in memory. The table is composed of pages that can be located in arbitrary locations within the system map, thus forming a secure integrity tree with no pre-provisioned memory. Hence, as shown in FIG. 5, both the protected regions of data and the integrity tree itself may be at a number of discontiguous regions in the address space with unallocated regions or regions allocated for other data in between.

A leaf page 46 within the Nested Protection Table 26 (integrity tree) holds integrity tags 61, grouped together in multiple Tag Groups 60 (leaf entries), where each tag corresponds to a protected memory chunk (address block).

A branch page 44 includes multiple Tag Groups (branch entries) 62, where each Tag Group 62 corresponds to a child page (either a further branch page 44 at the next level, or a leaf page 46) and each tag 56 within a Tag Group protects the integrity of a corresponding Tag Group 62 or 60 in the child page.

Initially, the table is empty and consumes no memory. A leaf page 46 is added when software registers a cache-line or a page to be integrity protected, and the corresponding leaf page is not found in the expected location in the nested table 26. The physical page locations of leaf pages and branch pages that are added to the NPT are arbitrarily defined by management software and these do not require any special protection guarantees.

Traversing the Nested Protection Table serves two purposes—reaching the leaf page and calculating the tags of the integrity chain that protects the tag. The example described below shows how these operations can be parallelized for mitigating the latency introduced by the linear traversal.

The Nested Protection Table (NPT) is not a classic n-ary integrity tree due to 3 reasons:
- The connection between a parent node and a child node is made through pointer association and not using index arithmetic as done for typical n-ary trees;
- A pointer in the table may be NULL, thus forming a structure that is not necessarily a complete tree;
- Each Branch Level in the tree may have (and will typically have) a different "arity" than previous one.

A cache-line requires integrity calculation only if a tag is found in the integrity page table. This allows for a quick detection that a cache-line does not require protection (without traversing the entire tree), as traversal can be halted when a NULL indication is found in a branch page 44.

The size of the nested protection table expands and shrinks dynamically. Also the potential address range covered by a given NPT (e.g. 64 GB) can be defined starting from any offset with the maximally supported physical address range (e.g. 64 TB). High performance can be achieved using caching and speculation and by leveraging a hint signal from an access control engine to the Nested Protection Engine allowing it to warm-up its caches.

More particularly, as shown in FIG. 4 the Nested Protection Table 26 is based on the following principles:
1. A tag 61, 56 is a value that allows verifying the authenticity of a memory chunk (typically a cache-line). There are various methods to calculate the tag over the memory chunk as described in Tag Calculation section.
2. A TagGroup 60, 62 is a collection of tags located within a consecutive memory chunk (typically a cache-line)
3. A Leaf page 46 contains multiple TagGroups 60 (leaf entries).
   a. Each tag 61 in the TagGroup 60 protects a chunk of memory.
   b. The number of Tag Groups 60 in a leaf page is defined by tag size, Leaf Page Size and Tag Group size.
      i. As an example a 4 KB leaf page may contain 64 tag groups where each group contains 8 tags of 64 bit each, and each tag protects a 64 B of memory thus the entire Leaf Page protects a 32 KB block of memory.
4. A Branch page 44 contains multiple branch entries 62 where each entry 62 includes the following parameters:
   a. NextPointer 58—which may point either to a leaf page or to a branch page at the next level
   b. Tag Group 56—a group of tags (integrity checking values—e.g. hashes, MACs or counters) where each tag protects a corresponding entry in the page pointed by NextPointer.

i. If NextPointer 58 points to a leaf page 46 then the tag protects a corresponding TagGroup 60 in the leaf page 46
ii. If NextPointer 58 points to a branch page 44 then the tag protects an entry 62 composed of a NextPointer 58 and a TagGroup 62 in the branch page.
5. A Root Table 38 contains a Base Pointer 64 pointing to the Level0 Branch page (Level0 includes a single page) and a single Tag Group 62 where each tag protects a corresponding entry 62 in the Level0 Branch page.
   a. The Root Table 38 resides within the chip boundary and serves as the root of trust for the entire NPT.

FIG. 4 shows an example of a Nested Protection Table that can protect up to 8 GB of memory, where Page size is 4 KB and Tag size is assumed to be 56 bits. The number of entries in each page varies according to the Branch level:

The Leaf page includes 64 Tag Groups where each group stores 8 tags.
The Level3 branch pages include 8 entries where each entry includes 64 tags and a pointer
The Level2 branch pages include 6
4 entries where each entry includes 8 tags and a pointer
The Level1 branch pages include 8 entries where each entry includes 64 tags and a pointer
The Level0 branch pages include 64 entries where each entry includes 8 tags and a pointer
The On-chip Root table includes a Base Pointer and 64 tags.

Figure 6:
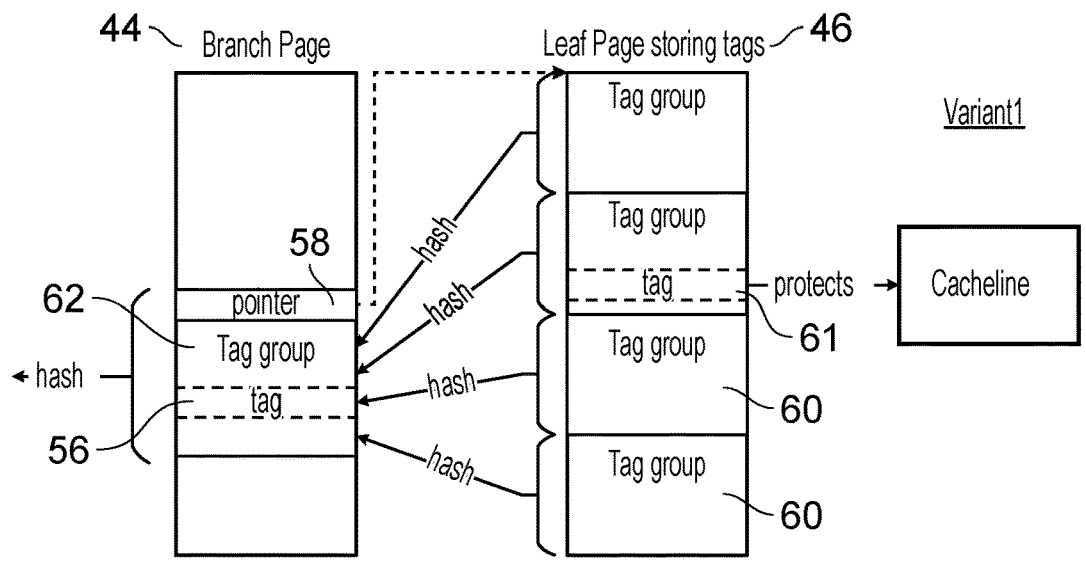
FIG. 6 shows a first example of implementing the tree as a tree of hashes.
Figure 7:
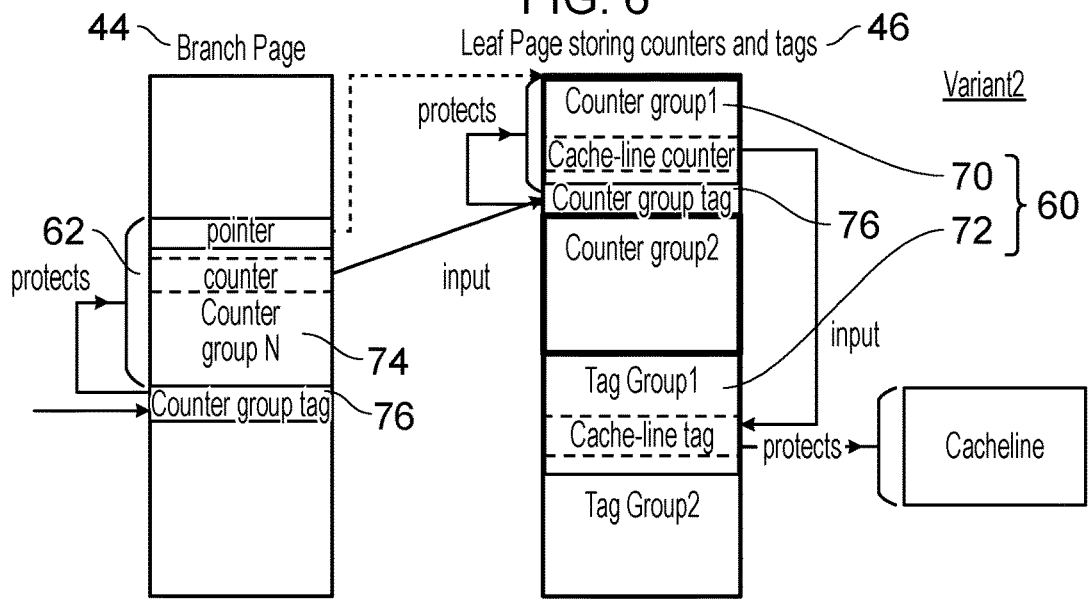
FIG. 7 shows a second example of implementing the tree as a tree of counters used as nonces for computing corresponding hashes which are not themselves protected by the tree.

FIGS. 6 and 7 show two variants proposed for the Nested Protection Branch and Leaf Pages. In both variants the memory required to store the integrity context is allocated on-demand.

As shown in FIG. 6, in Variant 1 the leaf page contains the actual tag values that are calculated over the corresponding cache-lines. Each branch entry 62 of the branch page 44 contains a number of tag values (hashes or MACs) each calculated over the contents of a corresponding branch entry 62 or leaf entry 60 of the child node pointed to by the pointer 58 of that branch entry 62.

As shown in FIG. 7, in Variant2 a leaf page contains:
1. Nonce (Number used Once) values 70 that are used as an additional input when calculating cache-line tags. The nonce allows to guarantee the freshness of the tag and can be implemented as monotonic counters. In Variant2 only the integrity of the counters needs to be protected by the NPT.
2. Tags 72, where each tag protects a corresponding cache-line and is calculated using a corresponding nonce. The tags integrity does not need to be protected by the NPT as this is indirectly guaranteed by protecting the counters.

Both Tags and Counters are grouped under corresponding Tag Groups and Tag Counters within the Leaf page. A given leaf entry 60 comprises the group of tags 72 and the corresponding group of counters (nonces) 70.

The Leaf Page has a pre-defined structure specifying the location of Counter Groups and their corresponding Tag Groups. This allows direct access to the location of the counter and tag that correspond to a given physical address.

On the other hand, in Variant 2 a given branch entry 62 of a branch page 44 comprises the pointer 62, a group of counters (nonces) 74, and a single tag value 76 computed over the counter group 74 using a corresponding counter provided by the corresponding branch entry 62 of the parent node of that branch page 44. Similarly, each counter in the counter group 74 is used in the computation of a respective child entry within the branch node or leaf node that is a child of that branch page 44.

Hence, counter integrity is guaranteed by forming counter groups and adding a counter tag 76 to each such group that protects the group integrity. An input to the counter tag calculation is an additional counter value from the parent node of the counter group. The advantage of variant 2 is that the protected counter can be significantly smaller than the tag and so the memory cost of protecting its integrity is lower.

The two variants of FIGS. 6 and 7 allow for trade-offing between memory footprint and calculation latency. Hence, the integrity checking values in a branch entry of a branch page 44 can be either integrity tags (hashes or MACs) generated based on contents of a corresponding child entry of a child page 44, or can be counters used in the computation of a counter tag 76 in the child entry of the child page 44.

Figure 8:
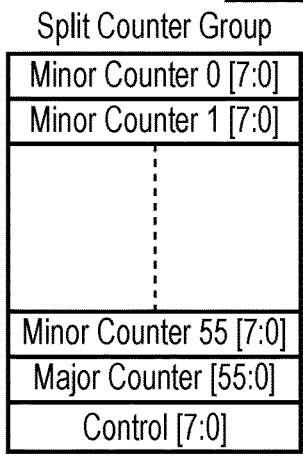
FIG. 8 shows two examples of representing the counters in the second example of FIG. 7.
Figure 8:
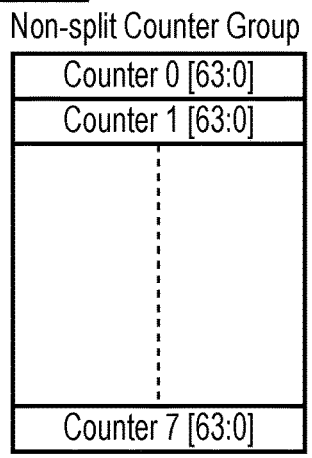

As shown in FIG. 8, in Variant2 there are two possible structures that can be considered for the Counter Group 70, 74 in a given entry of a leaf node or a branch node:
1. A Non-split Counter group, where each counter in the group has the full width defined by the cryptographic requirements (right hand side of FIG. 8).
2. A Split Counter group where a group of minor counters share a single major counter that is incremented whenever any minor counter overflows, thus allowing to save bits when storing the counters (left hand side of FIG. 8). With a split-counter implementation, when a minor counter overflows and the major counter is incremented in a given branch entry 62, the counter group tags 76 would need to be recomputed for all of the child entries in the child page pointed to by the pointer 62 of the given branch entry 62.

The operations for managing the Nested Protection Table (NPT) 26 and for using it to authenticate memory are carried out by the memory integrity checking circuitry 20 (which acts as an on-chip Nested Protection Engine (NPE)). The NPE performs the following operations:

Adding a Tag and Updating a Tag

Software registers its interest in protecting a cache-line address by requesting the NPE 20 to add a corresponding tag to the NPT. If the cache-line itself is not being read upon adding or initialized upon adding the tag then the tag may include a qualifier bit that is initially set to 0 and set to 1 later when the integrity value is calculated over the cache-line. Alternatively, the cache-line can be read as part of the Add operation and the integrity value for it is calculated and written to the tag.

Software can choose to register interest for integrity in any level of granularity (cache-line, page or block of pages), though working with higher granularities than a cache-line would guarantee a higher level of memory efficiency for the NPT.

Figure 9:
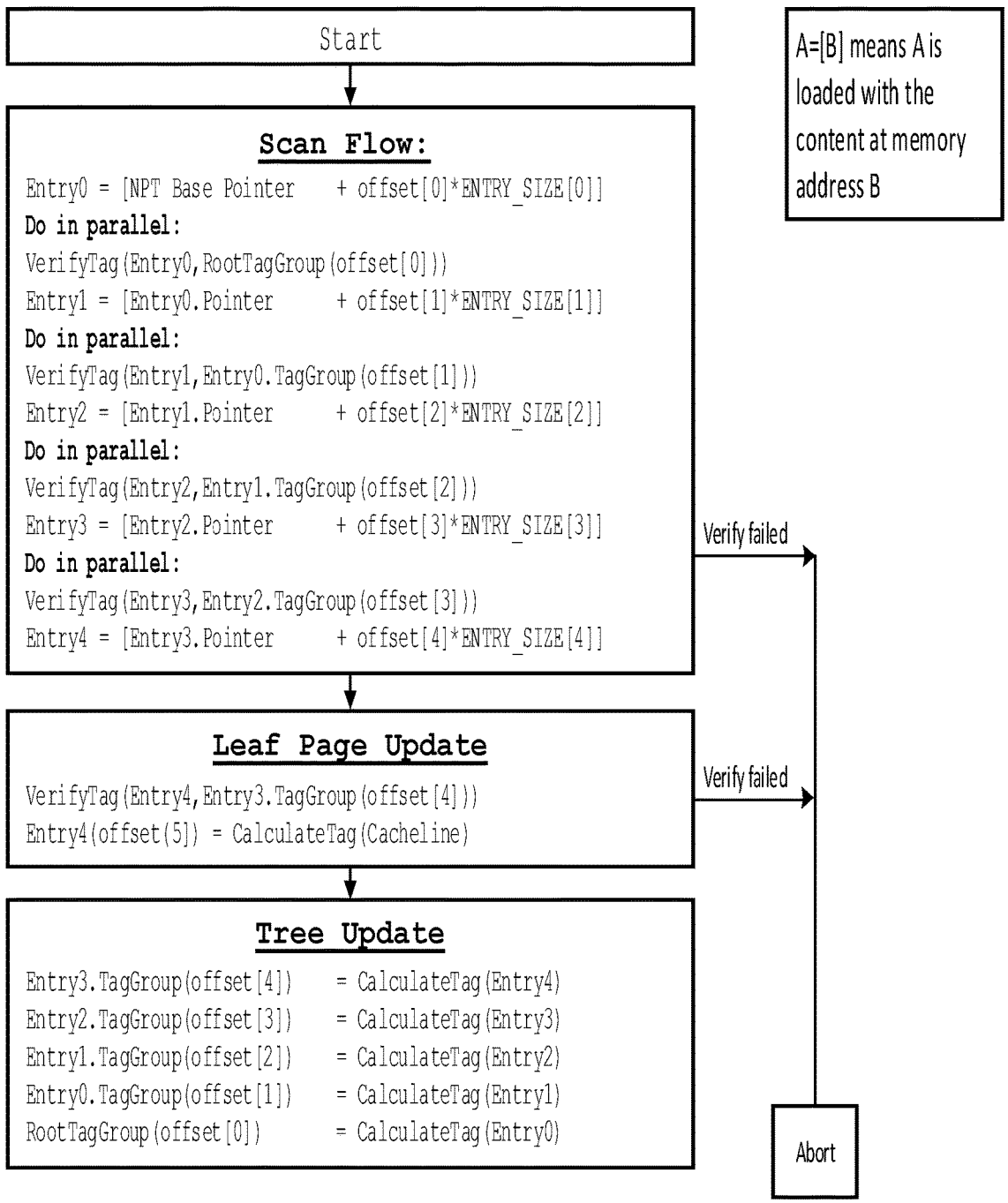
FIG. 9 is a flow diagram showing a flow for updating an integrity tag at a leaf node of the integrity tree.

The operations of Adding a tag to the NPT or Updating a tag in the NPT are based on a unified sequence as shown in FIG. 9 for the case of Variant1.

Note: At each stage of the flow if the pointer value is NULL then perform the following operations:
 a. Allocate a page in memory and set the pointer at the current stage to the address of the allocated page (pointer will be later included in tag the calculation).
 b. Initialize the new page to zeros.
 c. Initialize the Tag Group in the Entry of the updated pointer by calculating a tag over the corresponding child Tag Group (or Groups) in the added page.

The flow for updating a tag can be summarized as follows:
1. Partition PhysicalAddress[MSB:0] to a set of offsets (see FIG. 9) where each offset corresponds to a different NPT level
2. Scan the NPT starting from its base pointer by adding the address offset to the pointer and extracting the pointer to the next level from the content of the read result.
3. Execute the VerifyTag operation on each entry being read in parallel to extracting the next level pointer from it and submitting the next read.
4. When reaching the leaf page and reading the TagGroup from it the tag calculated over the updated cache-line is written to that group
5. Then all TagGroups on the chain from the leaf Tag Group to the Root Tag Group are re-calculated and stored to memory.

Tag Calculation Method (VerifyTag, CalculateTag Operations):

There are several options to calculate the tags, and we list here only some exemplary schemes. First of all, we distinguish two cases:
  In the hash tree case (Variant 1) the message m to hash is formed by the pointer and the group of hashes that are packed with it.
  In the counter tree case (Variant2), the message m can be the concatenation of the pointer and the group of counters that are packed with it and also may include also the corresponding counter $c_p$ in the parent node. If the Split Counter Group structure is used, the group of counters is intended to be a major counter with its set of minor counters, whereas the counter $c_p$ in the parent node is the concatenation of the major counter and of the minor counter corresponding to the child node.

Once the message m is defined, there is the question of computing its hash. Some methods are:
1. Use a standard or commonly used hash function, such as SHA-2, SHA-3, SipHash, etc. In the case of counter trees the parent counter $c_p$ is included in the message.
2. Use a Carter-Wegman Universal Hash Function. Write $m=m_1|m_2|\ldots|m_r$ where $m_1 \ldots m_{r-1}$ are of the same bitlength b and $m_r$ is either of the same bit length or padded to b bits. Then compute first $$h'=\Sigma_{i=1}^r \chi_i \cdot x^i$$

in a Galois Field F, where $\chi \in F$ is a non-zero secret value and then encrypt the result as $h=h'+E_K(c_p)$ (the addition is in the same Galois Field)

where $E_K(\ )$ is an encryption function using a secret global key K.
Alternatively, the encryption may be performed as $h=E_K(h'+c_p)$, but in this case the computation of h' cannot be performed in parallel with the invocation of $E_K(\ )$
3. Use a standard MAC by choosing a block cipher algorithm (such as AES) and generating an Integrity Check value by encrypting m using a key.
Note: If the memory storing the NPT is encrypted due to other considerations, the encryption step can be omitted as long as the parent counter $c_p$ is always included in m.

Verifying a Cache-Line

Figure 10:
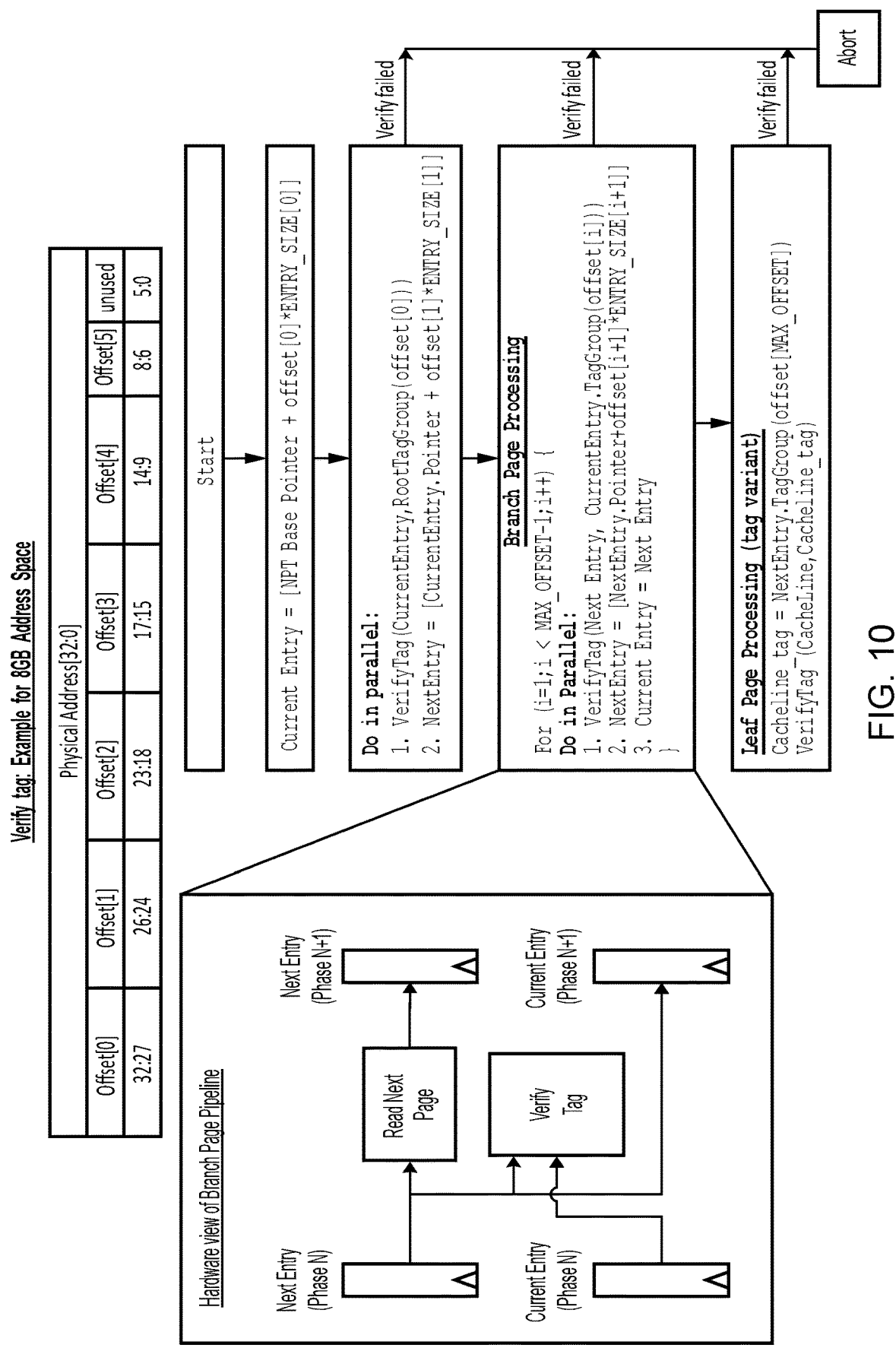
FIG. 10 is a flow diagram showing an example of a method for verifying integrity of a given address block of data using the integrity tree.

The operations of Verifying a cache-line are based on a sequence as shown in FIG. 10 for the case of Variant1. (Similar to steps 1-3 described above for FIG. 9)

As shown in the hardware view on the left of FIG. 10, Calculation and Tree Traversal occur in parallel so the latency of one operation is hidden by the other. The diagram illustrates the hardware engine that supports this parallelization.

The operations of Verifying a tag and Updating tag as described above for Variant1 are also applicable for Variant2 with the following minor changes:
  Verifying a tag:
    When Verifying the cache-line tag the counter that corresponds to that tag is included in the calculation
    Verifying a counter tag is performed by calculating the tag over all counters in the counter group and the parent counter.
  When updating a cache-line tag, the counter associated with that tag is incremented, and every parent counter of a counter that is incremented is incremented as well. The tag counters across this chain are then re-calculated over the updated counter values.

It will be appreciated that the precise details shown in FIGS. 9 and 10 are just one example, e.g. the number of tree levels and the number of bits in each offset portion of the physical address could be varied.

Removing a Tag

Tags can be removed from the database by defining a single bit qualifier flag in each tag that software updates to 0 when the cache-line no longer needs to be protected. It is also possible to have a single flag that qualifies multiple tags or tag groups.
Whenever a tag qualifier is zeroed then Software or the NPE 20 can also check if additional tags in the page are zero. By performing the check across all TagGroups in a page an entire page can be removed from the NPT.

Checking if Integrity Protection is Required

Whenever a Cache-line is accessed the NPE can resolve quickly that integrity protection is not required for it. This is done by traversing the NPT until reaching a NULL pointer or an invalid tag (which may be a tag with a reserved value or a tag with qualifier=0). since typically only a small portion of the memory is integrity protected, this method guarantees that the traversal will be short for the majority of cache-lines that do not require integrity as a NULL pointer would soon be found. The system can also augment this process by adding a hint on a read or write operation of whether integrity is required or not for the cache-line.

Performance Enhancements

Performance enhancing methods applicable to Merkle Trees (Namely—Caching and Speculative Execution) can also be applicable to the NPT with its own variants.

Caching NPT entries: In order to speed up performance, elements of the NPT can be cached within the cache 42 of the NPE 20. Either Branch page entries can be cached, Leaf Page entries or {Physical Address, Counter, Tag} tuples.

Speculative execution: Verifying the integrity of a cache-line does not necessarily have to block the return of the data of the user. The NPE may speculatively return data to the user before completing the verification flow and use an Abort signal that blocks any updates to Non-Volatile storage or the External 10 devices once an integrity error occurs. This way the system state is secured before the error propagates outside of system boundaries.

On top of the above we propose a new performance enhancing method based on a hint signal 82 from the memory access circuitry 12. In secure systems, MMU operations may result with the loading of a physical addresses into its caches and performing additional access control checks on the address before the actual Load/Store operation is performed. As shown in FIG. 1, once the Physical address is known to the TLB 80 or to the MMU these components can send a hint 82 to the NPE for a specific physical address so the NPE can warm up its caches by starting to read the corresponding Branch page entries, without waiting for any access permission checks performed by permission checking circuitry 84 to be complete. This way parallelization is achieved between MMU access control checks and integrity checks of a given cache-line access. While FIG. 1 shows an example of performing permission checks based on page table entries cached in a TLB 80, it would also be possible for other types of access permission checks to be performed to generate the hint.

Figure 11:
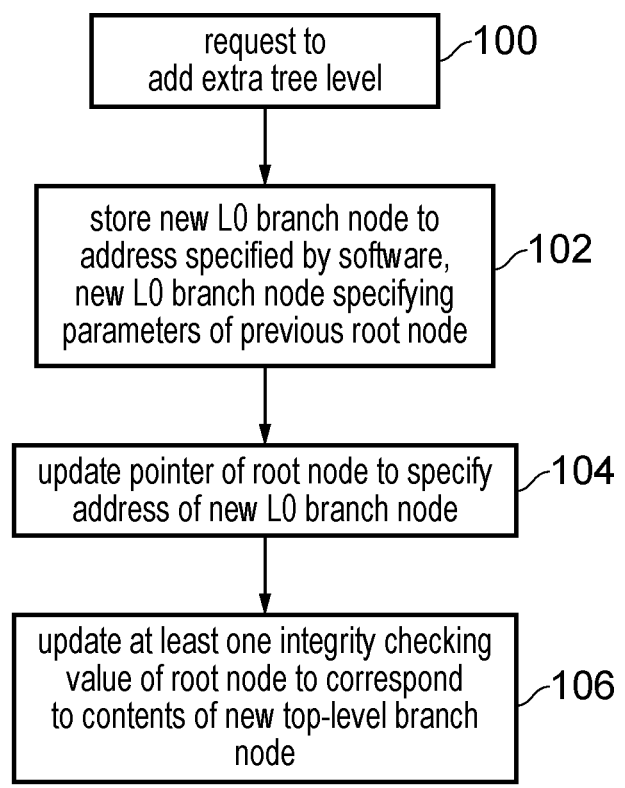
FIG. 11 is a flow diagram showing a method for adding an additional level to the integrity tree.

FIG. 11 shows another operation that can be performed by the memory integrity checking circuitry 20 to add an extra level to the integrity tree 26. At step 100 software may trigger sending a request to add an extra tree level. In response, at step 102 the integrity tree verification/generation circuitry 36 stores a new level 0 branch node 44 to the off-chip memory 14 at an address specified by the software in the request. The new level 0 branch nodes will specify parameters corresponding to those previously specified in the root node 38 of the table. The branch node 44 that was previously the level 0 branch node will therefore become a level 1 branch node, level 1 branch nodes will become level 2 branch nodes and so on. In the new level 0 branch node one of the tag groups (branch entries) 62 corresponds to the previous contents of the root node 38, and all the other branch entries 62 in the same branch page 44 may be set with the pointers 58 providing the null indicator, to indicate that there are not yet any further child nodes under those entries. At step 104, the integrity tree verification and generation circuitry 36 updates the pointer 64 in the root node 38 to specify the address of the new level 0 branch node which was allocated to memory. At step 106, the integrity tree verification/generation circuitry 36 updates at least one integrity checking value of the root node 38 to correspond to the contents of the new top-level branch node 44. If variant 1 described above is used then each tag within the root table may be updated based on a hash of a corresponding entry 62 of the new level 0 branch node 44 (where the hash is based on both the pointer and the tags). If variant 2 is used then the counters within the root table 64 may be updated to values used to calculate the corresponding counter hash within each entry of the new level 0 branch node.

Figure 12:
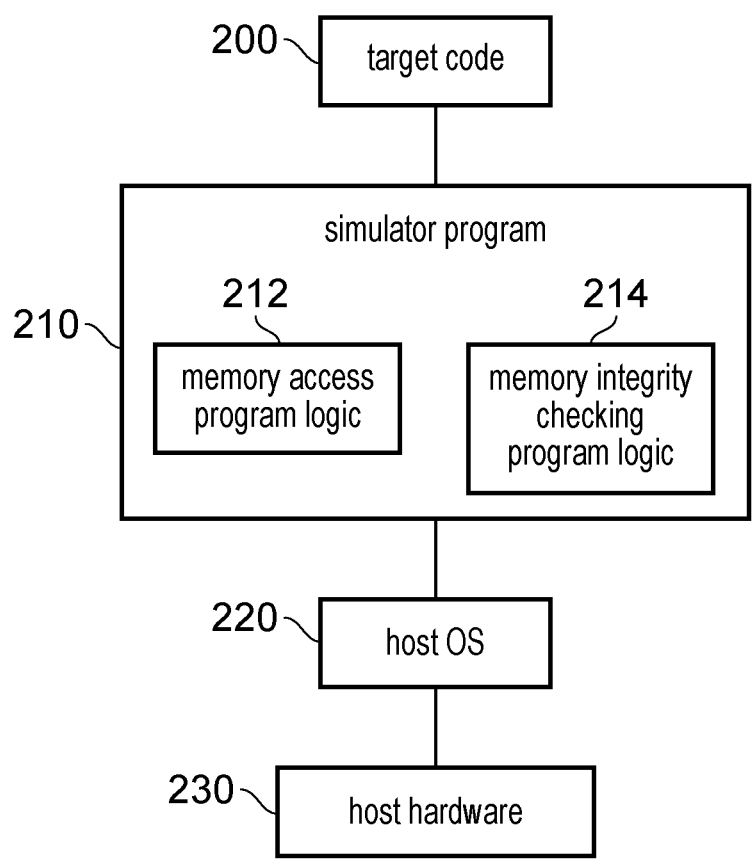
FIG. 12 shows a simulator example that can be used.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200, including described above, may be executed from within the instruction execution environment using the simulator program 210, so that a host computer 230 which does not actually have the hardware features of the apparatus 4 discussed above can emulate these features. The simulator program 210 may have memory access program access program logic 212 and memory integrity checking program logic 214 which emulates the functionality of the memory access circuitry 12 and memory integrity checking circuitry 20 described above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   memory access circuitry to control access to data stored in a memory; and
   memory integrity checking circuitry to verify integrity of data stored in the memory, using an integrity tree comprising a plurality of nodes including:

at least one leaf node comprising at least one leaf entry comprising at least one integrity tag for verification of a corresponding address block of data stored in the memory; and at least one branch node comprising at least one branch entry comprising:
- a pointer for specifying an address of a child node of the branch node, where the child node is a leaf node or a further branch node of the integrity tree, and
- at least one integrity checking value for verification of a corresponding branch entry or leaf entry of the child node;

wherein:

in response to a request specifying a target address of a given address block of data stored in the memory, the memory integrity checking circuitry is configured to trigger a top-down traversal of the integrity tree from a root node to a given leaf node comprising the integrity tag corresponding to the given address block;

the memory integrity checking circuitry is configured to halt the top-down traversal in response to detecting, on a path from the root node to the given leaf node, a branch node for which a corresponding branch entry for the given address block specifies a null indicator;

when the top-down traversal is triggered by a memory access request for triggering a memory access to the given address block in memory, the memory integrity checking circuitry is configured to perform at least one of:
- determine whether to treat the given address block requested to be accessed by the memory access request as a protected address block for which integrity verification is required or an unprotected address block for which no integrity verification is required in dependence on whether the top-down traversal detects a branch node for which the corresponding branch entry specifies the null indicator, wherein when the top-down traversal detects a branch node for which the corresponding branch entry specifies the null indicator, the memory integrity checking circuitry treats the given address block as an unprotected address block for which no integrity verification is required; and
- when the top-down traversal detects a branch node for which the corresponding branch entry specifies the null indicator, return an indication that integrity verification is successful for the given address block requested to be accessed by the memory access request.

2. The apparatus according to claim 1, in which the memory integrity checking circuitry is configured to verify integrity of information specified by a given branch entry, including the pointer, based on a corresponding integrity checking value specified in a parent node of the given branch node.

3. The apparatus according to claim 1, in which the memory integrity checking circuitry is configured to support the integrity tree being configured to include one or more leaf nodes specifying leaf entries corresponding to discontiguous groups of address blocks within a memory address space, for which at least one intervening group of address blocks between the discontiguous groups of address blocks is unprotected by the integrity tree.

4. The apparatus according to claim 1, in which the memory integrity checking circuitry is configured to support the integrity tree being configured to include nodes stored at two or more discontiguous groups of address blocks within a memory address space, for which at least one intervening group of address blocks between the discontiguous groups of address blocks comprises at least one of:
- unallocated memory; and
- memory allocated for storing data other than said integrity tree.

5. The apparatus according to claim 1, in which in the top-down traversal, for a given parent-child node pair of the integrity tree on a path from the root node to the given leaf node, said given parent-child node pair comprising a given parent node and a given child node, the memory integrity checking circuitry is configured to:
- trigger a read operation to read a corresponding child entry of the given child node from a memory address calculated based on the pointer specified by a corresponding parent entry of the given parent node and an offset identified based on the target address of said given address block; and
- perform a verification operation to verify integrity of the corresponding child entry based on a corresponding integrity checking value specified in the corresponding parent entry of the given parent node.

6. The apparatus according to claim 1, in which the null indicator comprises one of:
- the pointer specifying a null value;
- the integrity checking value corresponding to the given address block specifying a null value.

7. The apparatus according to claim 1, in which when the top-down traversal is triggered by a tag adding request for requesting addition of an integrity tag for the given address block to a corresponding leaf node of the integrity tree, and the top-down traversal detects a given branch node for which the corresponding branch entry specifies the null indicator, the memory integrity checking circuitry is configured to:
- trigger software to allocate memory address space for storing a further child node of the given branch node, and
- update the pointer of the corresponding branch entry of the given branch node to indicate an address specified by the software as being allocated for the further child node.

8. The apparatus according to claim 1, in which the memory integrity checking circuitry is configured to read a node of the integrity tree other than a root node from the same memory that stores the data protected by the integrity tree.

9. The apparatus according to claim 1, in which the memory integrity checking circuitry is configured to read a node of the integrity tree other than a root node from a different memory to the memory storing the data protected by the integrity tree.

10. The apparatus according to claim 1, in which the memory integrity checking circuitry is configured to read a root node of the integrity tree from an on-chip memory provided within the same integrated circuit as the memory integrity checking circuitry.

11. The apparatus according to claim 10, in which the root node comprises:
- a pointer for specifying an address of a top-level branch node of the integrity tree, where the top-level branch node is a child node of the root node; and
- at least one integrity checking value for verification of a corresponding branch entry of the top-level branch node.

12. The apparatus according to claim 11, in which in response to a request to add a level to the integrity tree, the memory integrity checking circuitry is configured to:
store a new top-level branch node of the integrity tree to an address specified by software as being allocated for storing the new top-level branch node, the new top-level branch node including the pointer and the at least one integrity checking value previously specified by the root node;
update the pointer of the root node to specify the address allocated for storing the new top-level branch node; and
update the at least one integrity checking value of the root node to correspond to contents of the new top-level branch node.

13. The apparatus according to claim 1, in which, in a given branch entry of a given branch node, each integrity checking value comprises an integrity tag derived as a function of the corresponding branch entry or leaf entry of the child node pointed to by the pointer of the given branch entry.

14. The apparatus according to claim 1, in which, in a given branch entry of a given branch node, each integrity checking value comprises at least one integrity nonce for computing a corresponding integrity tag stored in the corresponding branch entry or leaf entry of the child node pointed to by the pointer of the given branch entry, said corresponding integrity tag derived as a function of the integrity nonce and other contents of the corresponding branch entry or leaf entry of the child node.

15. The apparatus according to claim 14, in which the given branch entry specifies a group of integrity nonces corresponding to respective branch entries or leaf entries of the child node, and a shared integrity tag derived as a function of the group of integrity nonces and an integrity nonce specified in a parent node of the given branch node.

16. The apparatus according to claim 15, in which the group of integrity nonces comprises one of:
a group of non-split counters specified independently for each branch entry or leaf entry of the child node; and
a group of split counters, each split counter represented as a combination of: a major counter shared between the respective branch entries or leaf entries of the child node, and a minor counter specified separately for each branch entry or leaf entry of the child node.

17. An apparatus comprising:
memory access circuitry to control access to data stored in a memory; and
memory integrity checking circuitry to verify integrity of data stored in the memory, using an integrity tree comprising a plurality of nodes including:
at least one leaf node comprising at least one leaf entry comprising at least one integrity tag for verification of a corresponding address block of data stored in the memory; and
at least one branch node comprising at least one branch entry comprising:
a pointer for specifying an address of a child node of the branch node, where the child node is a leaf node or a further branch node of the integrity tree, and
at least one integrity checking value for verification of a corresponding branch entry or leaf entry of the child node;
in which:
in response to a request specifying a target address of a given address block of data stored in the memory, the memory integrity checking circuitry is configured to
trigger a top-down traversal of the integrity tree from a root node to a given leaf node comprising the integrity tag corresponding to the given address block;
in the top-down traversal, for a given parent-child node pair of the integrity tree on a path from the root node to the given leaf node, said given parent-child node pair comprising a given parent node and a given child node, the memory integrity checking circuitry is configured to:
trigger a read operation to read a corresponding child entry of the given child node from a memory address calculated based on the pointer specified by a corresponding parent entry of the given parent node and an offset identified based on the target address of said given address block; and
perform a verification operation to verify integrity of the corresponding child entry based on a corresponding integrity checking value specified in the corresponding parent entry of the given parent node; and
when the given parent node is a node other than a root node of the integrity tree:
the memory integrity checking circuitry is to trigger the read operation to read the corresponding child entry of the given child node in parallel with performing the verification operation for a previous step of the top-down traversal, said verification operation for the previous step comprising verifying integrity of the corresponding parent entry based on a corresponding integrity checking value specified in a parent node of said given parent node.

18. An apparatus comprising:
memory access circuitry to control access to data stored in a memory; and
memory integrity checking circuitry to verify integrity of data stored in the memory, using an integrity tree comprising a plurality of nodes including:
at least one leaf node comprising at least one leaf entry comprising at least one integrity tag for verification of a corresponding address block of data stored in the memory; and
at least one branch node comprising at least one branch entry comprising:
a pointer for specifying an address of a child node of the branch node, where the child node is a leaf node or a further branch node of the integrity tree, and
at least one integrity checking value for verification of a corresponding branch entry or leaf entry of the child node;
in which in response to a memory access request for requesting access to data for a given address block, the memory access circuitry is configured to:
perform access permission checking, separate from integrity verification, to check whether the given address block is allowed to be accessed based on attributes associated with the given address block; and
before the access permission checking is complete, provide a hint signal specifying an address of the given address block to the memory integrity checking circuitry.

19. The apparatus according to claim 18, in which in response to the hint signal, the memory integrity checking circuitry is configured to trigger a read of at least one node of the integrity tree before the access permission checking performed by the memory access circuitry is complete.

* * * * *